Aug. 19, 1958     A. J. NEWMAN ET AL     2,848,593
STRIP METAL ARC WELDING
Filed Aug. 10, 1954
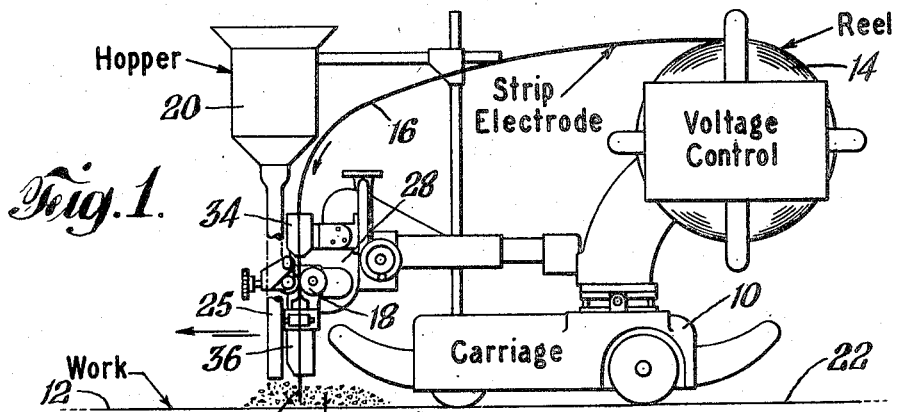
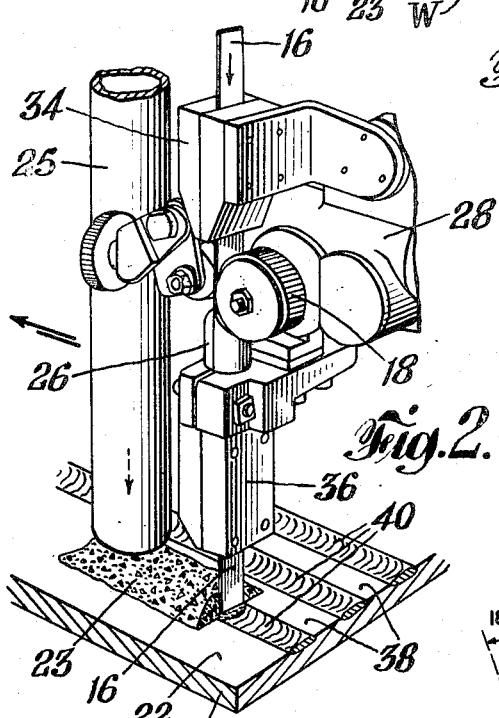
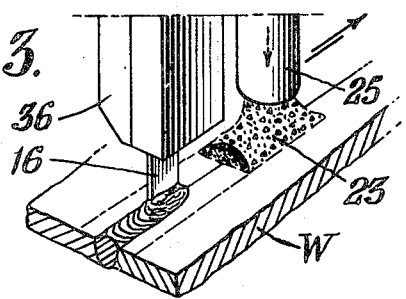
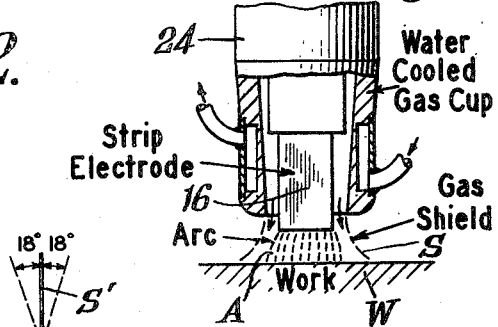
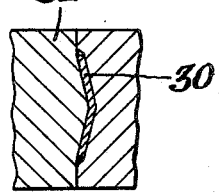
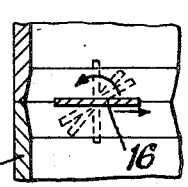
INVENTORS
ARTHUR J. NEWMAN
JACK L. WILSON
BY Barnwell R. King
ATTORNEY

2,848,593
STRIP METAL ARC WELDING

Arthur J. Newman and Jack L. Wilson, Niagara Falls, N. Y., assignors to Union Carbide Corporation, a corporation of New York Application August 10, 1954, Serial No. 448,944

5 Claims. (Cl. 219—73)

This invention relates to strip metal arc welding, and more particularly to submerged-melt welding of the type disclosed by Jones et al. 2,043,960, and gas-shielded arc welding of the "sigma" type disclosed by Muller et al. 2,504,868. While not limited thereto the invention is well suited for "surfacing," i. e. coating or cladding one metal with a layer of the same or another metal by metal-arc fusion welding.

The practice of cladding or surfacing metal by metal-arc welding is widespread. Wall thicknesses of pipes, or other cylindrical objects, are built up in this manner, as are thicknesses of plates and the like. In many instances, worn metal is replaced by surfacing, and the metal additions also provide heat, corrosion- or abrasion-resistant material, as well as heat-absorbing outer layers.

At the present time, conventional round electrodes of metal ranging from 1/16 to 5/16 inch in diameter, are used in metal arc welding for making surface deposits. The number of passes required to cover a given surface area of metal are determined by the width of the electrode and the size of the area being surfaced. If multiple electrodes are employed in a lateral arrangement to minimize the number of passes, complexities arise in maintaining their related positions which require special rigging. Special current application to the rods is also necessary. In known single- or multiple-electrode systems of surfacing, excessive surface penetration and dilution are usually produced.

A more successful present-day practice of surfacing is the series-arc technique of Outcalt et al. 2,669,640 in which two electrodes converge at an included angle of about 45 degrees. Such method is characterized by surface deposits of relatively low dilution and enjoys widespread use. The process, however, has one major disadvantage in the extreme accuracy necessary in positioning the electrode intersection relative to the plate. Any deviation from the required spatial relationship between electrodes and work interferes with the quality, shape, and dilution of the surface deposit.

It would be advantageous, therefore, if a surfacing method existed which did not require the extreme mechanical control of the series-arc technique but still maintained the excellent characteristics of that system. Also, a reduction in the number of passes required to surface a plate would be an improvement over present-day practice. These and other advantages are provided by the subject invention. In surface welding, relatively low dilution of the added metal is important so that the surface-improving qualities of the electrode metal are not lost. In the normal practice of surfacing with conventional round electrodes, the electrode metal may be mixed with or "diluted" by 30 to 50% of metal from the workpiece, and thus the properties of the former may be markedly altered.

In the preferred surfacing practice of the present invention, a bare electrode in the form of a relatively thin strip of metal is fed from a reel to the welding zone by serrated driving rolls through a guiding member in which a slot, conforming to, but slightly larger than the strip is provided. A welding current is caused to flow through a circuit which includes the work and the business end of the strip. In so welding with a strip electrode, the arc travels back and forth across the strip, maintaining its juncture with the work at the point of least resistance. Accordingly, heat from the arc embraces a greater width in its path of travel, and hence, the penetration and resultant dilution are kept to a minimum. Using a ferrous metal strip electrode in surfacing, dilution is approximately 10%; while in the case of copper alloy strip additions, dilution is as low as 4 to 5%. The selected width of the strip electrode depends on the area of the work on which the surface metal is to be deposited. Such width can vary from 0.25 to 1.00 inch, but need not be so limited, provided the width-to-thickness ratio of the strip has a critical value of at least 16:1. The selected thickness of the electrode is also variable. Copper strips 0.028 inch thick have been used, as well as mild steel strips 0.020- and 0.035-inch in thicknesses, and stainless steel strips that were 24 gage (0.024-inch) thick.

In surfacing a pipe or other cylindrical object, according to our invention, the work is rotated and the deposit applied spirally as the welding head moves parallel to the axis of rotation at a speed corresponding to the width of the electrode strip for a full turn of the cylinder. Welding composition in the case of submerged-melt welding is fed from a hopper and introduced to the welding zone just ahead of the arc. In plate surfacing the strip moves over the work, the arc being submerged in the welding composition which is fed similarly in front of the arc. However, for welding flat surfaces, the area to be surface welded can be entirely covered with the welding composition prior to the welding operation for each pass. Welds so made, employing strip electrodes, are sound and of acceptable surface appearance.

An important modification of our invention is in the welding of V butt joints, because the present welding process obviates the need for a coated electrode. For butt joints in thick metal plates where several passes are required, the use of our strip electrode or metal ribbon serves admirably. The extreme flexibility of the metal ribbon enables the operator to alter the position of the strip in relation to the seam with comparative ease, thus providing full control of the width of the deposited metal. By turning the strip to simulate a narrow electrode, a small, initial layer can be deposited at the base of the welding groove. By subsequent turns to the strip, the layers can be widened to conform to the width of the groove. Especially in the case of a poor fit-up, the strip can be transversely positioned to such an extent that blasting through gaps in improperly joined metal parts is prevented.

Additional advantages of butt welding with a thin-gage strip according to the invention are: More than one pass at a single level of the groove is unnecessary, since the electrode can always be turned to accommodate the entire width of the groove at the level of the weld being made. The thickness of the layer deposited may be controlled by predetermining the value of current applied or by controlling the work traversing, i. e., welding speed of the electrode.

The subject invention is not limited to submerged-melt welding, but includes the sigma welding in which case the arc is shielded by a suitable gas. Such other variations as exist between such two welding processes would, of course, also apply. However, the submerged-melt welding composition has an unexpectedly beneficial effect on the welding arc in the practice of the invention, in that it obviates undesirable distortion of the arc.

Although in the preferred practice of the invention, the strip electrode, when viewed in cross-section, is rectangular, the cross-sectional shape of the strip may be otherwise, such as suitable arcs or V's which serve to travel through the submerged flux more efficiently. Also, a U or V-shaped electrode may be utilized in butt welding by feeding the strip in an off-vertical position with the apex of the V lowered to conform to the V shape of the welding groove.

In the drawing:

Fig. 1 is a view in side elevation of strip welding apparatus illustrating the invention;

Fig. 2 is a fragmentary enlarged perspective view of a surfacing modification;

Fig. 3 is a fragmentary view of a butt welding set-up;

Fig. 4 is a view in cross section of V-strip modification;

Fig. 5 is a view partly in plan and partly in cross section showing how the strip can be oriented with respect to a welding groove;

Fig. 6 is a fragmentary view partly in elevation and partly in section of a sigma welding modification;

Fig. 7 is a view in side elevation of the invention in use in welding a cylindrical surface with a flat or bent strip that is more or less (±18°) perpendicular; and Fig. 8 is a similar view of the flat or bent strip, tangent to the cylindrical surface being welded.

As shown in Fig. 1 a self-propelled carriage 10 is mounted to travel on work 12 to be welded, or on a suitable track adjacent thereto. The carriage is provided with a reel 14 of electrode metal in the form of a ribbon or strip 16 which is fed toward the arc by motor-driven feed rolls 18 which are also provided on the carriage 10. A hopper 20, containing granular submerged-melt welding material, is mounted on the carriage to lay down a blanket of such material in front of the strip 16 on the surface 22 of the work W, which is a body of the metal to be surfaced or welded. As shown in Fig. 6, such hopper may be dispensed with and a suitably modified water-cooled nozzle 24 of the sigma type substituted, for conducting a stream of suitable arc protective gas such as argon and/or helium down around the business end of the strip 16.

In general our process comprises striking a metal fusing arc between such end of the bare strip 16 of metal and the surface 22 of the body W of metal to be welded, and feeding such strip 16 continuously in a rectilinear direction toward such arc as the end of the strip is fused by the arc uniformly across the width and progressively of the length of the strip. As shown in Figs. 1–3 the metal-arc welding of the strip takes place under a blanket 23 of granular submerged-melt welding composition which is deposited on the work surface by a tube 25 leading from the hopper 20. As shown in Fig. 6 the welding takes place under a stream S of suitable gas, such as argon, which excludes air (oxygen and nitrogen) from the arc A and thus protects the metal being welded from contamination. Any suitable arc shielding gas may be used with our invention for protecting the particular metal or metals being welded.

In actually carrying out the invention, both copper and steel strip electrodes were fed to the welding zone through a split copper tube 26 provided with a rectangular slot, slightly larger in cross section than that of the strip. A welding head 28, modified to include special serrated driving rolls 18, was used to feed the strip 16 through the tube. Two sets of rolls were used, one for feeding flat strip, the other (not shown) for forming and feeding strip 30 of bent, in this case V, cross section, Fig. 4. In the latter exceptionally good electrical contact is provided between the moving strip and contactor 32 due to such bending action. As shown in Figs. 1 and 2, the head 28 comprises spaced upper and lower parts 34 and 36, between which is disposed the feed rolls 18 which engage and feed the strip 16 through such head. The head 28 is adjustably mounted on the carriage for setting the tilt and orientation of the strip as desired.

*Surface deposits made with copper strip electrode*

The electrode was a flat, dead-soft-annealed, deoxidized copper strip, 0.750 inch wide by 0.028 inch thick, obtained in coils. By maintaining only a short distance between the feed rolls and the feed guide slot, as shown in Fig. 2, the soft copper strip was fed without buckling. Beads were deposited on mild steel plate, using welding conditions, according to the invention, resulting in minimum dilution of the copper deposit.

The results may be summarized as follows:

(1) Welds of 4 to 5% dilution, comparable to that associated with the series-arc technique, were obtained without need for the precise control of spatial relationship that is required with series-arc welding.

(2) The welds were sound and of acceptable surface appearance.

(3) Multibead surface pads were obtained by applying a series of suitably spaced parallel beads 40 (Fig. 2) and subsequently filling the intermediate spaces 38 with a second series of single-bead deposits. The first series was applied with direct current-straight polarity in order to minimize dilution. The second series was applied with direct current-reverse polarity in order to fuse into the adjacent beads and to cover the base plate. It was found that successively adjacent overlapping beads could not both be satisfactorily deposited with either straight or reverse polarity power alone, because the overlapping beads either failed to cover the preceding beads or overpenetrated the base plate.

(4) The effects of welding variables were found to parallel, in a general way, the effects of such variables in conventional single-electrode welding. Specific effects associated with welding with 0.75-inch wide by 0.028-inch thick copper strip were:

(a) *Current optimum, 350 amperes.*—Below 350 amperes, the welding control and the weld beads tended to become less uniform. Above 350 amperes, the welding control and weld beads were uniform, but the penetration increased considerably. With straight polarity the penetration was low, and with reverse polarity it was excessive, in single-bead deposits.

(b) *Voltage optimum, 30 to 35 volts.*—With decreasing voltage, the weld width became narrower, and the penetration greater. With voltage increasing above 35 volts, the welding action tended to become violent, and the reinforcement became rough.

(c) *Travel-speed optimum, 6 inches per minute.*—With greater speed, the penetration increased.

(d) *Inclination of electrode from vertical.*—The angle of the electrode to the vertical, up to 18 degrees, had no appreciable effect on either weld shape or penetration.

(e) *Submerged-melt welding composition.*—The best melt for our novel technique was found to be a blend of from 25 to 50% "AB" "Unionmelt" welding composition, balance "Grade 50" "Unionmelt" welding composition, 8 by 48-mesh size, of the Linde Air Products Company, a division of Union Carbide and Carbon Corporation. The introduction of the "AB" "Unionmelt" flux to Grade 50 "Unionmelt" flux improved the surface quality of the deposit, presumably by increasing the fluidity of the weld puddle. Some tendency toward formation of small gas holes accompanied the use of "AB" "Unionmelt" flux but such tendency was counteracted by adding 0.50% granular graphite to the blend for the purpose of deoxidizing the molten copper. Welds of more uniform shape were produced with relatively coarse than with relatively fine granular material.

(5) The deposits of acceptable surface appearance and relatively low dilution (as indicated by cross sectional examination) contained from 4 to 5% iron; others ranged from 6 to 13% iron.

Observations of the welding characteristics of strip electrode on flat base plate, according to the invention, indicated that circumferential deposits would be quite feasible on rounds of substantially large diameter, such as brake drums, or drying rolls. Electrode and melt consumptions for welds of low dilution, made at 350 amperes D. C.-S. P., 31 volts, and 6 and 8 inches per minute travel speed, were:

|   | Lb. Electrode per Foot of Weld | Lb. Melt per Foot of Weld | Lb. Melt per Lb. of Elect. |
|---|---|---|---|
| 6 I. P. M | 0.94 | 0.60 | 0.64 |
| 8 I. P. M | 0.70 | 0.47 | 0.67 |

All the foregoing data were obtained with copper strips of a single size and width-to-thickness ratio. Improved characteristics, such as higher travel speed, lower dilution, or wider welds, can be obtained with strips of other sizes.

*Surface deposits made with mild steel and stainless steel strip*

Preliminary deposits to determine approximate welding conditions were made with mild steel strapping, such as is used to bind heavy material for shipment, on mild steel base plate. Two strip sizes were tested—0.750 inch wide by 0.020 inch thick, and 0.750 inch wide by 0.035 inch thick, corresponding in cross sectional area with round electrodes of approximately $9/64$- and $3/16$-inch diameters, respectively.

Welds of good surface appearance were deposited with either size strip over a fairly wide range of welding conditions. Cross sectional examination indicated that with the proper combination of power and travel speed, a relatively low order of dilution resulted. In general, in carrying out the invention, the best welding conditions were: 300 to 400 amperes, 28 to 30 volts, and 8 to 12 inches per minute travel speed. Grades 50 and 80 "Unionmelt" compositions were used. Grade 50 proved superior in terms of welding stability and weld appearance.

In order to obtain a basis for comparison of dilutions of stainless steel deposits made with strip electrode with deposits made by the series-arc technique, a number of deposits were made using ¾-inch wide by 24-gage (0.024-inch) thick, type 18–8 stainless steel strip which was obtained in straight lengths by shearing from 10-foot wide sheet stock. This strip was of approximately the same cross sectional area as a $5/32$-inch diameter round electrode. It was found that good stability could be obtained with welding currents of 325 to 550 amperes, 28 to 35 volts, and 6 to 12 inches per minute travel speed. In terms of low dilution, the best results were attained at about 350 amperes D. C.-S. P., 30 volts, and travel speeds of 6 to 8 inches per minute. The dilution of the best of these deposits was found to be from 9 to 12%.

Because the entire welding zone is blanketed with "Unionmelt" flux during our welding operation it may be assumed that the losses of alloy content, other than by dilution, were to the fused melt. Chemical analyses of fused melt from strip electrode stainless steel welds deposited at 350 amperes D. C.-S. P., 30 volts, and 6 and 8 inches per minute travel speed showed 3.1% and 2.9% total chromium, respectively. The ratio of fused melt to weight of electrode deposited for these welds was about 1:15; hence, by analysis, the loss of chromium to the melt was from 3.6 to 3.3%, respectively, of the weight of the deposit, or an average of 19% of the original chromium content of the electrode, which is in good agreement with the established 18 to 20% loss. This may be offset, however, by the use of a chromium-bearing welding composition.

Electrode and melt consumptions for welds of low dilution made at 350 amperes D. C.-S. P., 30 volts, 6 and 8 inches per minute travel speed, were:

|   | Lb. Electrode per Foot of Weld | Lb. Melt per Foot of Weld | Lb. Melt per Lb. of Elect. |
|---|---|---|---|
| 6 I. P. M | 0.48 | 0.55 | 1.15 |
| 8 I. P. M | 0.38 | 0.44 | 1.19 |

The results with type 18–8 stainless steel using a 0.750 inch wide by 24 gage (flat) strip are summarized as follows:

(1) Welds of 9 to 12% dilution, much lower than is obtained with the single-electrode technique, were obtained without need for close spatial control.

(2) The welds were sound, and the surface quality was equal to that obtained with series-arc.

(3) Multibead pads could be deposited, by the overlapping technique.

(4) Specific effects observed with the 0.75-inch wide by 0.024-inch thick type 18–8 stainless steel strip used for the tests were:

(a) *Current optimum 350 amperes D. C.-S. P.*—Below 350 amperes, the welds were not uniform. With increasing current above 350 amperes, the welds retained their uniformity, but the penetration increased. The least penetration was obtained with direct current-straight polarity, followed by alternating current, and reverse polarity.

(b) *Voltage optimum 30 to 33 volts.*—With decreasing voltage, the weld beads became narrower and the penetration greater. With voltage increasing above 33 volts, the welding action became too violent and the weld became rough.

(c) *Travel speed optimum 6 to 8 I. P. M.*—With greater speed, the penetration increased. Six inches per minute was slightly better than 8 inches per minute travel speed in terms of dilution.

(d) *Inclination of the electrode from the vertical.*—As with the copper strip, little difference in weld quality or shape resulted from feeding the electrode tilted at either a leading or a trailing angle from the vertical.

(e) *"Unionmelt" welding composition.*—Grades 20, 50 and 80 "Unionmelt" were tried; Grade 50 "Unionmelt" flux appeared slightly better than Grade 80, and both were superior to Grade 20.

Welds of dilution comparable to that obtained by the series-arc technique were obtained according to the invention with strip electrodes. With copper strip, the dilution was of the order of 5%, as determined by iron content. With stainless steel strip, the total loss in alloy content was much less than with the wire electrode process.

Because a single electrode is used, the strip electrode technique is not affected by changes in spacing between the base plate and the feed tip. This feature is of the utmost commercial importance because it eliminates the one major disadvantage of the series-arc process and opens uses for which series-arc is not suitable for mechanical reasons.

Other uses for strip electrode which take advantage of the different nature of its melt-off characteristics compared to conventional round electrodes are (a) for butt-welding of rusty or oily sheets, for which the strip could be aligned parallel to the direction of welding and utilize the long dimension of the section, Fig. 3, for longer application of welding heat per unit of weld length than with a round electrode, (b) for welding in the presence of poor fit-up for which the strip 16 could be positioned, as shown in Fig. 5, at a sufficient angle from the groove to bridge the gaps, thus permitting coverage without burn-through as is made possible by the transversely positioned, parallel electrode technique.

It is believed that the reason for the lower dilution obtained by surfacing according to the invention with strip electrodes compared with that obtained with conventional round electrodes lies in the nature of the melt-off and resultant concentration of heat beneath the electrode. In the case of strip electrode, the arc automatically travels back and forth across the end strip seeking to maintain itself at the point of least resistance between strip and base metal, whereas with round electrodes of relatively small diameter, the arc is confined to a narrow path at the end of the electrode. As a result, the heat from the strip-electrode-arc is spread over a greater width of base metal, at the same travel speed, than is the heat from the round-electrode-arc, and the penetration and consequent dilution of the latter are, therefore, substantially larger.

The width-to-thickness ratio of the strip which we prefer to use is one that is preferably of the order of 32:1. To the best of our knowledge the largest width-to-thickness ratio of other prior techniques using a strip electrode was never more than that of Shrubsall 2,357,432 which was about 16:1. We avoid the need for oscillation of the strip which was necessary, according to Shrubsall in his technique, by our use of a greater width-to-thickness ratio. Also by the use of our relatively great width-to-thickness ratio, strips of less than one inch in width can be used in our novel process.

A series of welds were made to determine the minimum width-to-thickness ratio for strip electrodes which would retain the advantages of the strip for surface deposits. Welds were deposited on mild steel plate with strips of 0.037 inch thickness (20 gage), and widths of ¾, ⅝, ½, ⅜, and ¼ inch. The width-to-thickness ratios were:

| Widths: | Widths-to-thickness ratios |
| --- | --- |
| ¾ | 20 to 1 |
| ⅝ | 16.7 to 1 |
| ½ | 13.3 to 1 |
| ⅜ | 10.0 to 1 |
| ¼ | 6.7 to 1 |

Such welds were deposited at representative current densities and at a travel speed of 7 inches per minute. Although the penetration remained shallow through the ⅜-inch (ten-to-1 ratio) strip, as the width-to-thickness ratio decreased below approximately 16 to 1, the welds became rougher and less uniform in appearance. To obtain the maximum properties of low penetration, uniformity, and smoothness of the surface welds deposited, it is necessary to limit the lower width-to-thickness ratio to 16 to 1. In addition to roughness, the smaller-width strips produce a relatively high bead in relationship to the width, which necessitates overlapping the parallel beads considerably in order to cover the entire surface of a plate without forming ridges. With a wide deposit, it is necessary to cover only a slight portion of the preceding bead to maintain a fairly uniform overall surface. As stated above, low penetration is extremely important in surfacing to prevent the loss of alloying ingredients in the surface deposition. This loss is inevitable when penetration is excessive.

Although other factors, such as strip feeding rate, are not affected by the strip having a width-to-thickness ratio greater than 16 to 1, the preceding information supports the critical nature of the range embraced by subject invention.

Simulated butt welds were deposited in grooves cut in ½-inch plate with the strip in both longitudinal and transverse positions. The weld beads were of good surface appearance and were sound, but the penetration was insufficient in all cases to melt through the root of the V, leaving a small quantity of fused or partially fused welding composition at the bottom of the weld. Although time did not permit a thorough exploration of effects of increased current and travel speed and of decreased voltage, enough tests were made to show that low penetration was characteristic. From these results, it appears that the subject process is adaptable for applications where low penetration is desirable, such as surface cladding and butt welding where the root spacing is too wide for the conventional round electrode technique.

The invention includes the use of either a bent or a flat strip S', Figs. 7 and 8, fed either perpendicularly to the surface of a workpiece O, Fig. 7, or tangentially as in the case of a cylindrical surface C, Fig. 8, or at angles to the vertical of at least 18 degrees either way, Fig. 7.

We claim:

1. Process of arc welding metal for surfacing a metallic base which comprises striking a metal fusing arc between the end of a non-tubular electrode consisting of a relatively thin and wide bare continuous flat strip of metal and the surface of a body of metal to be welded, the rest of said strip being carried by a reel, said strip being wide open and having a width-to-thickness ratio of at least 16:1 in cross section, simultaneously drawing such strip from said reel and continuously feeding such strip of metal in a rectilinear direction toward such arc as the end of the strip is fused by the arc which automatically travels back and forth across such end of the strip, maintaining its juncture with the surface of such body at the point of least resistance, and relatively moving the surface of said body and strip so that the major axis of the strip is perpendicular to the direction of the weld, whereby the metal of such strip is uniformly deposited on and welded to the surface of such body.

2. Process of arc welding as defined by claim 1, in which the metal strip is rectangular in cross section and has a width-to-thickness ratio of the order of 32:1.

3. Process of arc welding as defined by claim 1, in which the surface of the body is grooved, and the direction of relative movement of the bent strip and the surface of the body along such welding path is in the direction of the groove and at an acute angle to the direction of feed of such strip.

4. Process of metal arc welding in which spaced parallel deposits are so made on a body with straight-polarity-direct current, and the intervening spaces left therebetween are subsequently filled by similarly made deposits with reverse-polarity-direct current.

5. A method of surface welding metal plates or cylindrical objects by the metal-arc welding process as defined by claim 1, comprising the use of a metal strip electrode varying in width from approximately 0.25 to 1.00 inch, the resultant characteristics of deposits obtained by said process being relatively low penetration and dilution as well as sufficiently wide depositions to keep to a minimum the number of passes required to surface a given surface area.

References Cited in the file of this patent

UNITED STATES PATENTS

| 405,345 | Coffin | June 18, 1889 |
| 1,356,468 | Peters et al. | Oct. 19, 1920 |
| 1,381,647 | Knoll | June 14, 1921 |
| 1,956,406 | Vars | Apr. 24, 1934 |
| 2,043,960 | Jones | June 9, 1936 |
| 2,191,469 | Hopkins | Feb. 27, 1940 |
| 2,191,471 | Hopkins | Feb. 27, 1940 |
| 2,269,369 | Hafergut | Jan. 6, 1942 |

(Other references on following page)

UNITED STATES PATENTS

| | | |
|---|---|---|
| 2,347,914 | Kricker | May 2, 1944 |
| 2,357,432 | Shrubsal | Sept. 5, 1944 |
| 2,407,746 | Johnson | Sept. 17, 1946 |
| 2,423,190 | Kennedy | July 1, 1947 |
| 2,427,350 | Carpenter et al. | Sept. 16, 1947 |
| 2,430,055 | Kennedy | Nov. 4, 1947 |
| 2,446,598 | Klinke | Aug. 10, 1948 |
| 2,490,024 | Bernard | Dec. 6, 1949 |
| 2,504,868 | Muller | Apr. 18, 1950 |
| 2,532,410 | Kennedy | Dec. 5, 1950 |
| 2,532,411 | Kennedy | Dec. 5, 1950 |
| 2,653,212 | Kinkead | Sept. 22, 1953 |

FOREIGN PATENTS

| | | |
|---|---|---|
| 279,886 | Great Britain | Dec. 8, 1927 |
| 292,318 | Great Britain | June 21, 1928 |
| 370,092 | Germany | Feb. 27, 1923 |